(12) United States Patent
Kinney

(10) Patent No.: US 7,746,391 B2
(45) Date of Patent: Jun. 29, 2010

(54) RESOLUTION PROPORTIONAL DIGITAL ZOOM

(75) Inventor: Steven R. Kinney, Sunnyvale, CA (US)

(73) Assignee: Jai Pulnix, Inc., San Jose, CA (US)

( * ) Notice: Subject to any disclaimer, the term of this patent is extended or adjusted under 35 U.S.C. 154(b) by 1089 days.

(21) Appl. No.: 11/395,391

(22) Filed: Mar. 30, 2006

(65) Prior Publication Data

US 2007/0229680 A1    Oct. 4, 2007

(51) Int. Cl.
*H04N 5/262* (2006.01)
(52) U.S. Cl. .............. 348/240.2; 348/240.3; 345/660
(58) Field of Classification Search .......... 348/240.2, 348/240.3; 345/660, 668
See application file for complete search history.

(56) References Cited

U.S. PATENT DOCUMENTS 5,940,128 A * 8/1999 Morimura ................ 348/240.3
2004/0032628 A1 * 2/2004 Sato et al. ................ 358/514
2004/0143602 A1 * 7/2004 Ruiz et al. ............. 707/104.1
2005/0179531 A1 * 8/2005 Tabe ....................... 340/447
2006/0197732 A1 * 9/2006 Oyaizu et al. ............. 345/99
2007/0276590 A1 * 11/2007 Leonard et al. ........... 701/207
2009/0012995 A1 * 1/2009 Sartor et al. ........... 707/104.1

* cited by examiner

*Primary Examiner*—Tuan Ho
*Assistant Examiner*—Kent Wang
(74) *Attorney, Agent, or Firm*—Law Offices of Thomas E. Schatzel A Professional Corp.

(57) ABSTRACT

A resolution proportional digital zoom system comprises a CCD imaging device with over a million pixels resolution. A standard fixed-1X optical lens is fitted to the imager. A communication channel with a limited bandwidth is used to transmit video. Such bandwidth is substantially less than the imager's full resolution times its frame rate. A user is provided with controls to pan and zoom within the imager's field of view. The pixel resolution is proportionally controlled such that video output data rate on the communication channel is optimal and held within maximum limits at any pan/zoom setting.

10 Claims, 4 Drawing Sheets

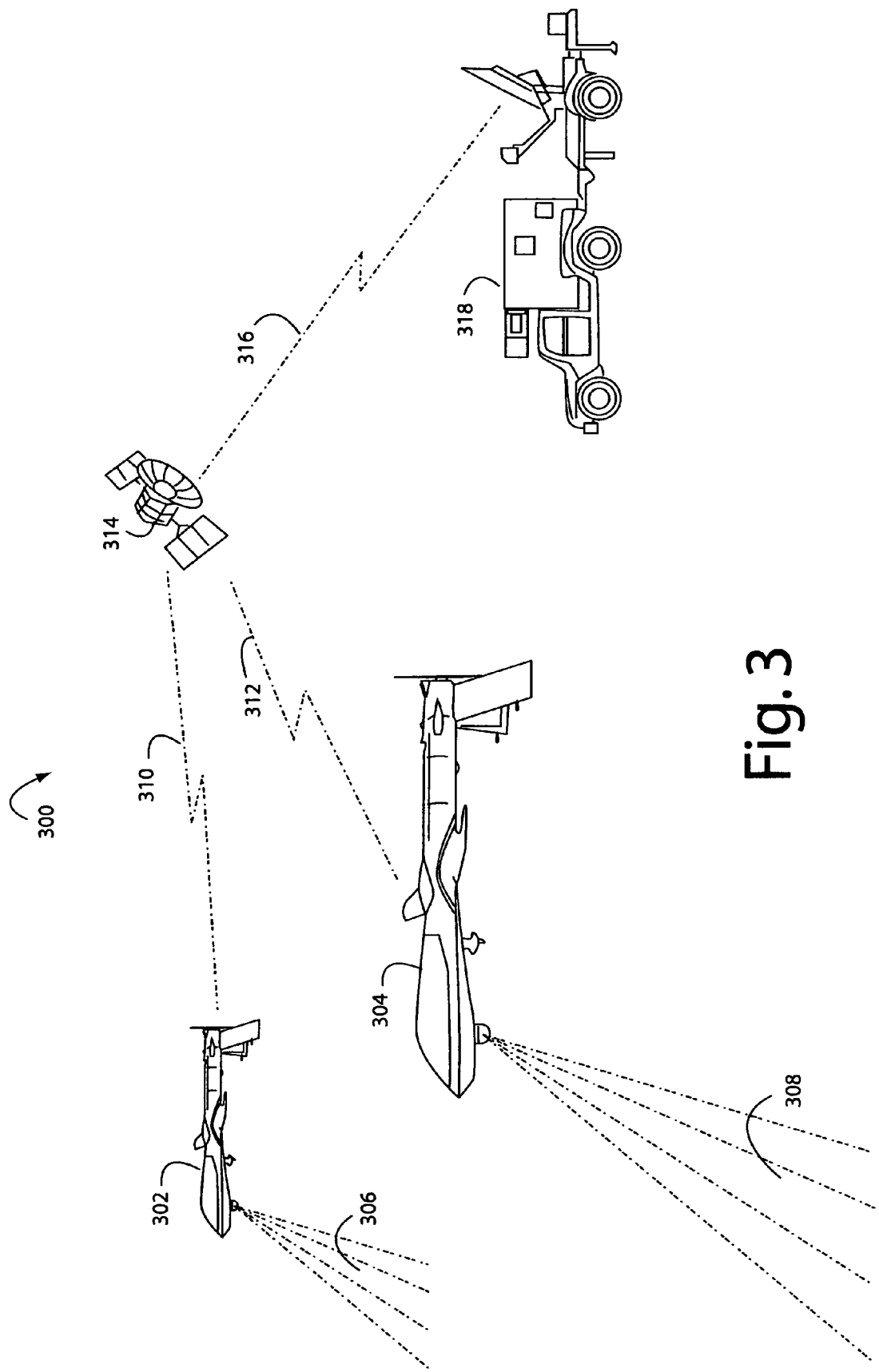

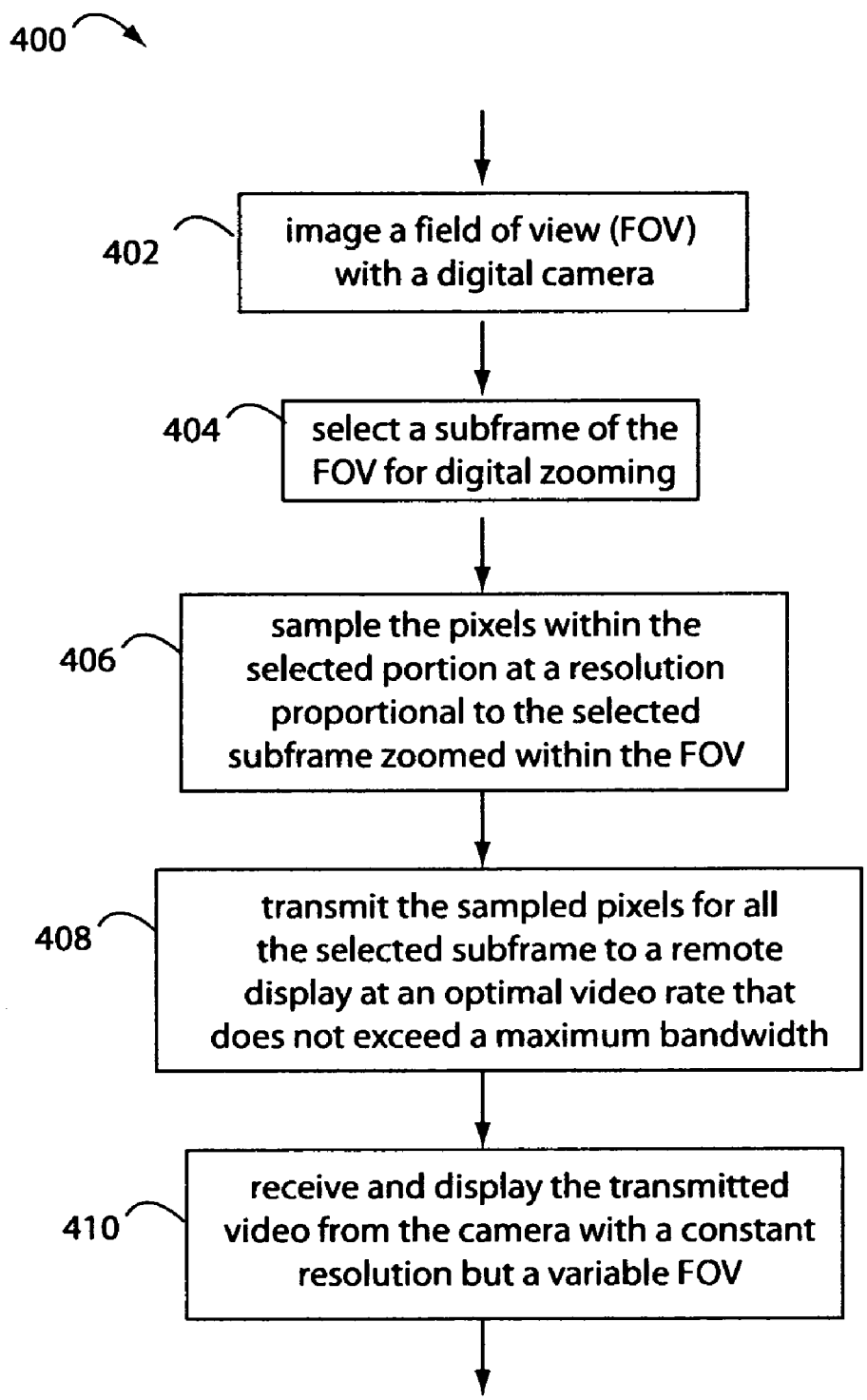

RESOLUTION PROPORTIONAL DIGITAL ZOOM

FIELD OF THE INVENTION

The present invention relates to digital cameras, and more specifically to maintaining a constant output data rate from a digital camera while varying the field of view by proportionally adjusting the effective resolution.

BACKGROUND OF THE INVENTION

Modern digital cameras can produce very high resolutions at very affordable prices. Four megapixel imagers are now commonplace and eight megapixel devices will soon be commercially available. With 4-8 megapixels possible in every frame of video, thirty frames per second in a standard format can tax even a broadband communications channel.

Not every part of a picture frame is of interest, and sometimes the user wants to zoom in on some particular part. Optical zooming can be used to zoom in on a subject in the center of the imagers field of view (FOV), and digital zoom can be used to enlarge any area in a region of interest. Digital zooming can be done very quickly because it is electronic, but optical zooming can take some time because the lens must be moved. Optics have an advantage in being able to capture detail, but the very dense pixel configurations now available in image devices is taking away a lot of that advantage.

Complex and bulky optics are sometimes not appropriate or practical in extreme applications. Such optics can also be too expensive, too vulnerable, too heavy, or too big. This is especially true in unmanned aerial vehicles (UAV's) that use cameras to fly and spot targets in hazardous areas and situations. Large complex optics are impractical for a number of reasons in UAV's, and the communication channels also have very limited bandwidths.

SUMMARY OF THE INVENTION

Briefly, a resolution proportional digital zoom system embodiment of the present invention comprises a CCD imaging device with over a million pixels resolution. A standard fixed-1X optical lens is fitted to the imager. A communication channel with a limited bandwidth is used to transmit video. Such bandwidth is substantially less than the imager's full resolution times its frame rate. A user is provided with controls to pan and zoom within the imager's field of view. The pixel resolution is proportionally controlled such that video output data rate on the communication channel is held constant within maximum limits at any pan/zoom setting.

An advantage of the present invention is that an imaging system is provided that has all the benefits of zooming.

Another advantage of the present invention is that a imaging system is provided that can zoom instantly.

A further advantage of the present invention is that a imaging system is provided that uses simple optics.

A still further advantage of the present invention is a method is provided that allows smaller, more protectable optics to be used in ruggedized and battlefield shielded camera systems.

These and other objects and advantages of the present invention will no doubt become obvious to those of ordinary skill in the art after having read the following detailed description of the preferred embodiment as illustrated in the drawing figures.

DESCRIPTION OF THE DRAWINGS

FIG. 3 is a diagram representing a battlefield theater with UAV's being controlled by a mobile command and communicating through a satellite link; and FIG. 4 is a flowchart diagram of a method embodiment of the present invention for resolution proportional digital zoom transmission of a remote image to a user over a limited bandwidth communications link.

DETAILED DESCRIPTION OF THE EMBODIMENTS

Figure 1:
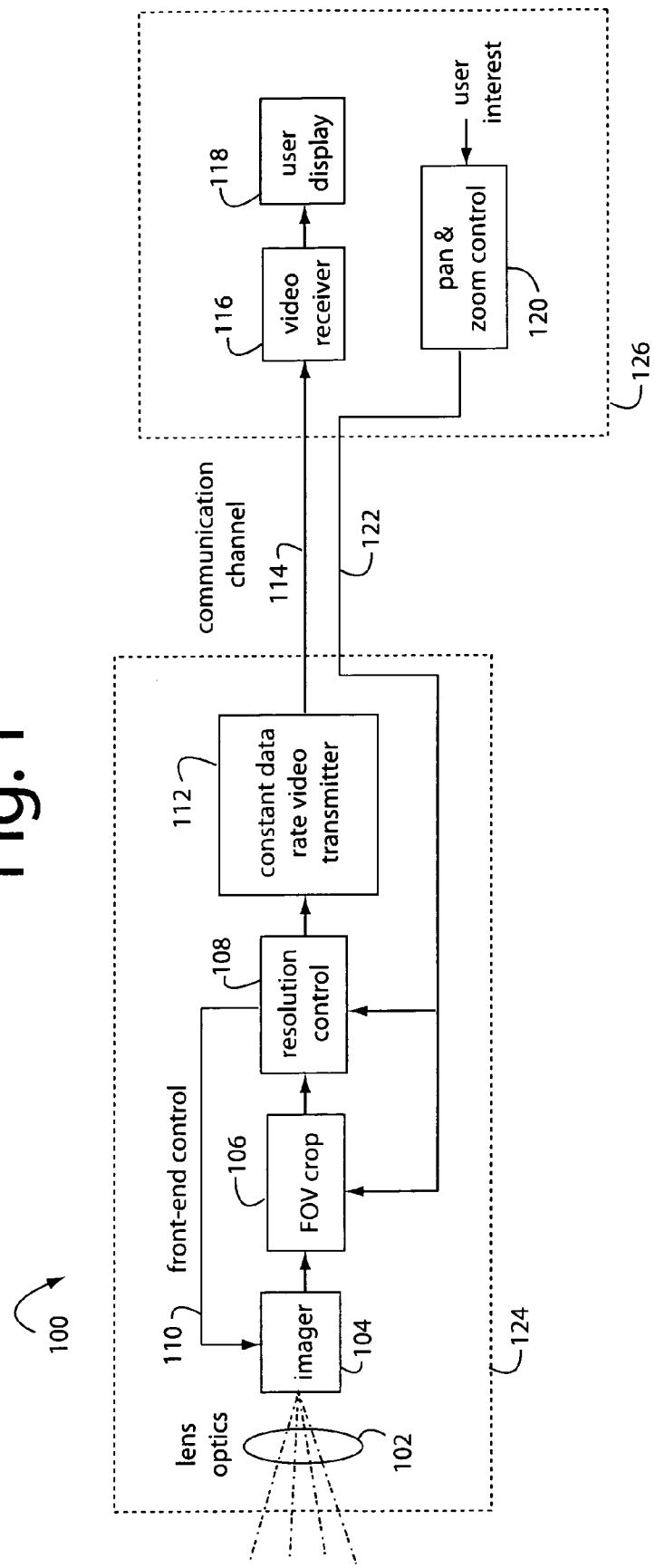
FIG. 1 is a functional block diagram of resolution proportional digital zoom system embodiment of the present invention.

FIG. 1 represents resolution proportional digital zoom system embodiment of the present invention, and is referred to herein by the general reference numeral 100. System 100 comprises an optical lens 102 coupled to an imager 104. Such typically includes a 4-8 megapixel charged coupled device (CCD) driven directly, e.g., by a CCD driver unit with its output coupled to a correlated double sampling (CDS) video amplifier unit. The present invention is not limited to the type of imaging device. Other types of imaging devices like frame transfer CCD, CMOS, GaA, InSb, etc., will also give good results.

The CCD 104 can be an interline transfer type with vertical shift registers next to each photosensitive pixel area and associated transfer gates that transfer in parallel the charges accumulated during an exposure period, e.g., from each pixel area to a respective vertical shift register. All the pixels are exposed simultaneously during each shuttered exposure period. The entire image of individual pixels is captured for each operation of the shutter. CCD is, for example, a progressive scan interline CCD type KAI-0370 series image sensor marketed by Eastman Kodak Company (Rochester, N.Y.). Such device has a vertical overflow drain structure, and provides low dark current, high output sensitivity, negligible lag and low smear. CCD provides full line resolution for each image capture, which allows for imaging of fast moving objects without breakup of the image due to successive field capture. Other models of imaging devices may be used as well. The CDS/video amplifier unit includes a collated double sample and hold circuit for capturing the output of the shift registers in CCD, as well as a video amplifier for amplifying the samples. The output is coupled to an analog to digital converter (ADC). The digital samples output from the ADC are supplied to a memory for storing alternate lines of a captured video image in digital form.

The system 100 further comprises a field-of-view (FOV) cropping controller 106 and a resolution controller 108. The image resolution ultimately delivered to the user can be managed with either a front end control 110 or a back-end computation. The front end control 110 can be used to read out every pixel, or less than every pixel from the imager 104. The back-end computation can be used to pass through every pixel, or to compute a virtual display pixel from an average of two or more real imager pixels. The FOV selected by FOV cropping controller 106 from the imager 104, and the resolution of that sub-frame selected by resolution controller 108 are interactive and balanced to result in a constant data rate feed to a video transmitter 112.

A communications channel video uplink 114 is a bottleneck and a limiting factor in the amount of video information that can be delivered to the user. A principal objective of system 100 is to deliver the best picture possible to the user given the zoom and FOV settings required by the user.

The system 100 further comprises a video receiver 116 and a user display 118. Such display has a typical resolution of 500-by-500 pixels. A pan and zoom controller 120 allows a user to select various video portions of interest from the imager 104 via a command channel 122. Whatever FOV is selected, the resolution will be proportionally adjusted automatically to keep the data rate in the video communications uplink optimal and within its limits.

Figure 2:
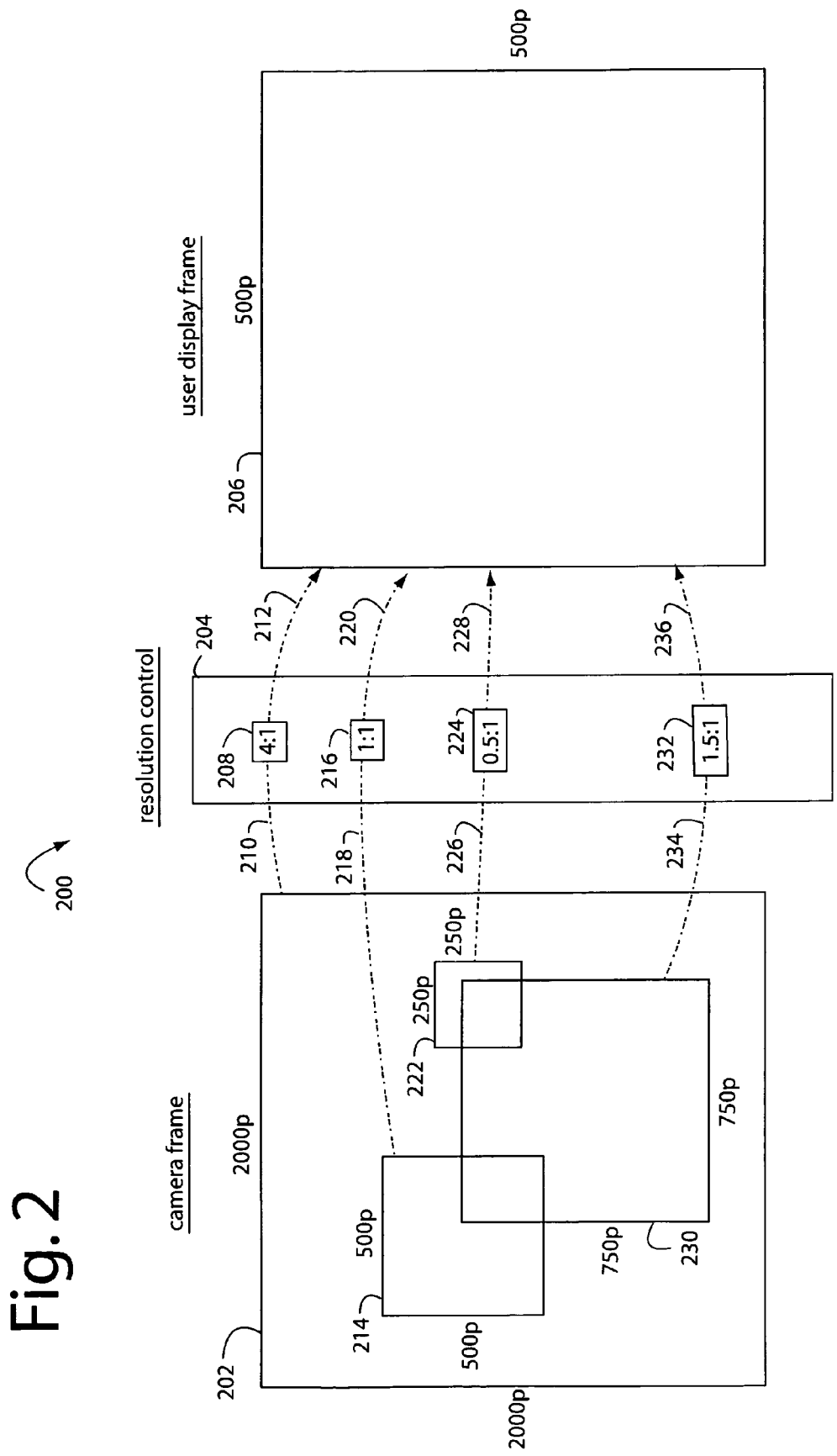
FIG. 2 is diagram representing how resolution proportional digital zoom is used to maintain a constant video uplink data rate that completely fills the user display at any FOV and zoom setting.

FIG. 2 illustrates a resolution proportional digital zoom 200 like that implemented in FIG. 1 by controller 108. A camera frame 202 has a full resolution, e.g., of 4M pixels, e.g., 2000-by-2000. All 4M-pixels are too much to transmit over communications channel uplink 114. So a resolution control 204 is needed to adjust the data rate, e.g., to fill a user display frame 206 of 500-by-500 pixels. In such case, a 4:1 process 208 is used to convert an imager output 210 to a video transmission 212. If a 500-by-500 sub-frame 214 is selected by the user, then a 1:1 process 216 is used to convert an imager output 218 to a video transmission 220. If a 250-by-250 sub-frame 222 is selected by the user, then a 0.5:1 process 224 is used to convert an imager output 226 to a video transmission 228. If a 750-by-750 sub-frame 230 is selected by the user, then a 1.5:1 process 232 is used to convert an imager output 234 to a video transmission 236.

One way to implement the 4:1 process 208, for example, would be to sample every fourth pixel in every fourth line output by imager 104. Another way would be to mathematically average, or bin, every four pixels and four lines. It may be advantageous in some situations to store every pixel output by imager 104 to a large video memory so that different resolutions and FOV's can be repeatedly be queried from one frame as the user learns where to look and what needs to be inspected. In such case, front-end control 110 would not be used in favor of a back-end control, video memory, and post-processing. If optical zoom was being used, the fringe information outside the selected FOV would not be available.

In FIG. 2, a variety of FQV's selected from imager 104 by FOV cropping controller 106 are represented by sub-frame 202 (a whole frame), 214, 222, and 230. In practice, any size sub-frame with any position within frame 202 could be accommodated. The full user display screen 206, with 500-by-500 resolution, is used every time, regardless of the FOV and zoom levels selected.

FIG. 3 illustrates a useful application of the system and methods represented in FIGS. 1 and 2. A battlefield theater 300 is populated with unmanned aerial vehicles (UAV's) 302 and 304 that carry camera systems to respectively image fields-of-view (FOV) 306 and 308. Satellite communication links 310 and 312 have limited bandwidth, e.g., 1M bits/second, and carry the constant data rate video uplinks described in connection with FIGS. 1 and 2. A satellite 314 connects through a downlink 316 to a command vehicle 318. Such carries a user display and command console to control UAV's 302 and 304.

The US Air Force Predator Medium Altitude Endurance (MAE) Unmanned Aerial Vehicle (UAV) includes an air vehicle, associated sensors, communications equipment, a ground control station (GCS), and a data dissemination system. A typical Predator deployment uses four such air vehicles with sensors and data links, a Ground Control Station (GCS), and a Trojan Spirit II SATCOM system.

The air vehicle itself is a mid-wing monoplane with a slender fuselage housing the payload and fuel, a high aspect ratio wing, inverted-V tails, and a four-cylinder Rotax engine. A satellite communication system removes a line-of-sight with the GCS limitation that would otherwise exist.

The UAV's sensors typically include an electro-optic/infrared (EO/IR) Versatron Skyball with zoom and a spotter lenses, and a Westinghouse 783R234 synthetic aperture radar (SAR). The ground control station has a pilot position and a payload operator position, a Data Exploitation, Mission Planning and a Communications (DEMPC) position where imagery is annotated and initially exploited, and a SAR workstation.

The TROJAN SPIRIT II (TS-II) is a Special Compartmented Information (SCI) satellite communications (SATCOM) system that allows transmission and receipt of secure voice and National Imagery Transmission Format (NITF) imagery data. The TS-II physically consists of two High Mobility Multi-purpose Wheeled Vehicles (HMMWVs) and two trailer-mounted SATCOM antennas. Sensor imagery is disseminated from the Predator ground control station via the Trojan Spirit II SATCOM system using the Joint Deployable Intelligence Support System (JDISS) and the Joint Worldwide Intelligence Communications System (JWICS). Live video is disseminated through the Joint Broadcast System (JBS).

The UAV Ground Control Station (GCS) incorporates an pilot and payload operator (PPO) workstations, data exploitation, mission planning, communication (DEMPC) terminals, and synthetic aperture radar (SAR) workstations. Mission imagery recording is located in the GCS, as the Predator has no onboard recording capability. The PPb workstations provide primary control of the air vehicle and the sensor payload. The DEMPC workstations allow data exploitation, mission planning, mission and payload monitoring, and system management. SAR workstations control, monitor, and are used for limited exploitation of the SAR data.

The system 100 described it FIG. 1 is especially useful in the UAV's 302 and 304 because the optics lens 102 can be so simple. Simple optics translate directly into weight savings, cost savings, less bulk, and less complexity. All these are particularly important in a UAV because the payloads are very critical and constrained. A further advantage is obtained in the UAV application by eliminating optical zoom. In flight, a UAV operator needs to be able to quickly zoom and pan. Electronic digital methods allow this to be done instantaneously.

In other military applications, the simplification of the camera optics can also be imperative. For example, some Humvee vehicles are fitted with a camera and gyro-stabilizing gimbals on a mast. A user display is included inside a protected compartment carried on the vehicle chassis. These specialized vehicles are used for reconnaissance, fire control, and other command functions in a battlefield. Size and weight are major considerations for the camera, and too much bulk would be hard to shield in protective enclosures. So reducing the size, weight, and complexity of the camera optics in such an application directly translates into producibility, reliability, and survivability. The mast and gimballing are such that a communication link needs to be used that has only modest bandwidth capabilities, so the resolution proportional digital zoom is a necessary mode of operation to get acceptable levels of performance.

Picking faces out of a crowd and zooming in to recognize individuals can involve several cameras in an area that all share the same communications link back to a control center. Such sharing reduces the bandwidth available to individual cameras. The methods and systems described in FIGS. 1-3 can be used to make optimal use of the limited bandwidth in these situations both zoomed wide or zoomed tight.

A resolution proportional digital zoom method embodiment of the present invention for a digital camera system increases the resolution of a digital image as an area of interest is zoomed in and the field of view is decreased. The proportionality of increases in resolution in response to decreases in the field of view is such that a video serial output data rate is maintained over a communication channel to a remote display. In one embodiment, such zooming is allowed in steps that represent whole pixels. In another embodiment, continuous zooming is accommodated by mathematically computing or interpolating pixel values for a user display of constant pixel dimensions.

FIG. 4 is a flowchart of a method embodiment of the present invention for resolution proportional digital zoom transmission of a remote image to a user over a limited bandwidth communications link, and is referred to herein by the general reference numeral 400. Method 400 includes a step 402 in which a digital camera images a field-of-view through an optics system. A step 404 responds to a user command in which some subframe is selected for zooming in. Such subframe will have pixel dimensions of m-by-n, e.g., for a total of m*n pixels. A step 406 samples "S" these pixels because there is not enough video communication channel bandwidth "BW" to send all m*n pixels at an "f" frame-rate. Ideally, the sampling will be proportional to the size of the zoomed-in subframe such that S(m*n)*f=BW. If that is not possible, at least S(m+n)*F≦BW must be true so the maximum bandwidth is not exceeded in a step 408. A step 410 receives and displays the selected subframe on a user display, e.g., display 118 in FIG. 1.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A resolution proportional digital zoom system, comprising:
    a digital camera with an image and an output for a video frame with a frame-rate "f";
    characterized by:
    a video communications uplink for connection to a remote user control site, and having a limited bandwidth "BW";
    a front end control for reading out every imager pixel, or less than every imager pixel from said imager;
    a device to pass through every imager pixel to a back-end computation where a virtual display pixel can be computed from an average of at least two imager pixels;
    a field-of-view (FOV) cropping controller for selecting a video subframe with a resolution of m*n pixels from said video frame for zoom control in response to a user command; and
    a resolution controller for sampling pixels within said video subframe such that samples "S" times m*n times "f" is less than or equal to the bandwidth "BW", S(m+n)*F≦BW;
    wherein, the image resolution of video frames ultimately delivered to a user is manageable with either the front end control or said back-end computation.

2. The resolution proportional digital zoom system of claim 1, further comprising:
    a remote user display for receiving said video communications uplink such that every video subframe is controlled to be displayed with constant resolution and screen size at any of a range of zoom settings commanded.

3. The resolution proportional digital zoom system of claim 1, further comprising:
    a continuous resolution control means included in the resolution controller that adjusts samples "S" such that S(m*n)f=BW, wherein a constant display size and resolution can be maintained at a user display for a range of FOV settings.

4. The resolution proportional digital zoom system of claim 1, further comprising:
    a fixed optics coupled to the digital camera such that zoom and pan commands from a user are substantially accommodated by the FOV controller.

5. A method of resolution proportional digital zoom control, comprising:
    using a digital camera to image a field-of-view (FOV) through an optics system to produce a video frame;
    responding to a user zoom command with a video subframe selection having pixel dimensions of m-by-n included within said video frame;
    sampling said video subframe at a rate "S" to manipulate its resolution such that the product of S(m*n) remains a constant, and such that a frame rate "f" times S(m*n) over a range of zoom dimensions m*n does not exceed a bandwidth "BW" of a communications channel; and
    transmitting a sampled video subframe out through a video uplink at a data rate that does not exceed "BW".

6. The method of claim 5, further comprising:
    transmitting a sampled video subframe out at a data rate that is constant and substantially fits within "BW" over said range of zoom dimensions m*n.

7. The method of claim 5, wherein:
    the step of sampling includes computing the values of virtual pixels averaged from real pixels included in said video subframe.

8. The method of claim 5, wherein:
    the step of sampling includes dropping out pixels from those included in said video frame with a front-end control to produce an integer reduction in resolution wherein said BW will not be exceeded.

9. An unmanned aerial vehicle (UAV) system, comprising:
    an aerial vehicle with a communications link to a control center for a video uplink having a limited bandwidth "BW" and a command downlink;
    a digital camera with an imager disposed in the UAV, and having an output for a video frame of pixels with a frame-rate "f";
    a front end control for reading out every imager pixel, or less than every imager pixel from said imager;
    a device to pass through every imager pixel to a back-end computation where a virtual display pixel can be computed from an average of at least two imager pixels;
    a field-of-view (FOV) cropping controller disposed in the UAV, and for selecting a video subframe with a resolution of m*n pixels from said video frame for zoom control responsive to said command downlink; and
    a resolution controller disposed in the UAV, and for sampling pixels within said subframe such that samples "S" times m*n times "f" does not exceed the bandwidth "BW" of said video uplink to a remote user display.

10. The UAV system of claim 9, further comprising:
    a large video memory to store every pixel output by imager to such that different resolutions and FOV's can be repeatedly be queried from one frame by a user; and
    a fixed optics coupled to the digital camera such that zoom and pan commands by said user can be instantaneously and digitally accommodated by the FOV controller without an adjustable optics.

* * * * *